US 9,813,964 B2

(12) United States Patent
Keskitalo et al.

(10) Patent No.: US 9,813,964 B2
(45) Date of Patent: Nov. 7, 2017

(54) SIGNALING FOR MOBILITY AND MOBILITY STATE ESTIMATION

(71) Applicant: Nokia Technologies Oy, Espoo (FI)

(72) Inventors: Ilkka Keskitalo, Oulu (FI);
Jussi-Pekka Koskinen, Oulu (FI);
Jarkko Koskela, Oulu (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 15/032,699

(22) PCT Filed: Oct. 30, 2014

(86) PCT No.: PCT/FI2014/050811
§ 371 (c)(1),
(2) Date: Apr. 28, 2016

(87) PCT Pub. No.: WO2015/063371
PCT Pub. Date: May 7, 2015

(65) Prior Publication Data
US 2016/0262075 A1     Sep. 8, 2016

Related U.S. Application Data

(60) Provisional application No. 61/898,892, filed on Nov. 1, 2013.

(51) Int. Cl.
*H04W 36/24*      (2009.01)
*H04W 24/08*      (2009.01)
(Continued)

(52) U.S. Cl.
CPC ......... *H04W 36/245* (2013.01); *H04W 4/005* (2013.01); *H04W 16/32* (2013.01);
(Continued)

(58) Field of Classification Search
CPC . H04W 76/023; H04W 24/10; H04W 76/048; H04W 24/02; H04W 48/12;
(Continued)

(56) References Cited

U.S. PATENT DOCUMENTS 7,212,818 B2 * 5/2007 Haumont .............. H04W 4/005
455/421
7,505,446 B2 * 3/2009 Pecen ................. H04W 36/245
370/328

(Continued)

FOREIGN PATENT DOCUMENTS

CN    EP 2434797 A1 * 3/2012    .......... H04W 36/245
JP    EP 1703665 A4 * 9/2007    ............. H04L 41/00
(Continued)

OTHER PUBLICATIONS

International Search Report and Written Opinion received for corresponding Patent Cooperation Treaty Application No. PCT/FI2014/050811, dated Dec. 11, 2014, 17 pages.
(Continued)

*Primary Examiner* — Mahendra Patel
(74) *Attorney, Agent, or Firm* — Mintz Levin Cohn Ferris Glovsky and Popeo, P.C.

(57) ABSTRACT

Methods and apparatus, including computer program products, are provided for signaling. In some example embodiments, there is provided a method. The method may include making mobility information including visited cell history available based on at least received mobility state estimation configuration information; and reporting, by the user equipment, the mobility information including the visited cell history. Related systems, methods, and articles of manufacture are also disclosed.

18 Claims, 4 Drawing Sheets

(51) Int. Cl.
*H04W 4/00* (2009.01)
*H04W 16/32* (2009.01)
*H04W 76/02* (2009.01)
*H04W 48/12* (2009.01)

(52) U.S. Cl.
CPC ......... *H04W 24/08* (2013.01); *H04W 76/021* (2013.01); *H04W 48/12* (2013.01)

(58) Field of Classification Search
CPC . H04W 24/08; H04W 36/245; H04W 76/021; H04W 4/005; H04W 16/32; H04W 4/00; H04W 76/02; H04W 8/08; H04W 36/32; H04W 36/30; H04L 5/0053
USPC ..... 455/444, 556.1, 405; 370/252, 328, 331; 709/226
See application file for complete search history.

(56) References Cited

U.S. PATENT DOCUMENTS

| | | | | |
|---|---|---|---|---|
| 8,005,058 | B2* | 8/2011 | Pecen | H04W 36/245 370/236.2 |
| 8,355,751 | B2* | 1/2013 | Dietz | H04M 1/72577 455/556.1 |
| 8,559,954 | B2* | 10/2013 | Song | H04W 36/0072 370/254 |
| 2008/0016213 | A1* | 1/2008 | Akinaga | H04L 41/00 709/226 |
| 2008/0043672 | A1* | 2/2008 | Sebire | H04W 36/0055 370/331 |
| 2010/0173626 | A1* | 7/2010 | Catovic | H04W 76/027 455/423 |
| 2010/0173633 | A1* | 7/2010 | Catovic | H04W 76/027 455/436 |
| 2012/0039305 | A1* | 2/2012 | Han | H04W 36/245 370/332 |
| 2012/0142355 | A1* | 6/2012 | Jha | H04W 36/0061 455/436 |
| 2012/0164972 | A1* | 6/2012 | Shim | H04W 24/02 455/405 |
| 2012/0282968 | A1* | 11/2012 | Toskala | H04W 24/10 455/517 |
| 2013/0083713 | A1* | 4/2013 | Johansson | H04W 52/0225 370/311 |
| 2013/0165120 | A1* | 6/2013 | Nylander | H04W 8/08 455/436 |
| 2013/0208661 | A1* | 8/2013 | Nylander | H04W 48/17 370/328 |
| 2013/0229931 | A1* | 9/2013 | Kim | H04W 24/10 370/252 |
| 2013/0231116 | A1* | 9/2013 | Mildh | H04W 72/0406 455/436 |
| 2015/0208303 | A1* | 7/2015 | Jung | H04W 8/08 455/436 |

FOREIGN PATENT DOCUMENTS

| | | | | |
|---|---|---|---|---|
| KR | 20040056980 A | * | 7/2004 | ........ H04W 36/0011 |
| KR | WO 2013147499 A1 | * | 10/2013 | ............. H04W 8/02 |
| SE | EP 2594095 A1 | * | 5/2013 | ............. H04W 8/08 |
| WO | 2012008887 A1 | | 1/2012 | |
| WO | 2013147499 A1 | | 10/2013 | |

OTHER PUBLICATIONS

3GPP R2-114316; Enhancements for UE Mobility State Estimation; 3GPP TSG-RAN WG2 Meeting #75; Athens, Greece, Aug. 22-26, 2011; Aug. 16, 2011.

"Mobility Information Reporting When Entering Connected State", 3GPP TSG-RAN Working Group 2 meeting #83bis, R2-133113, Agenda: 7.1.1.1, CATT, Oct. 7-11, 2013, pp. 1-4.

"Mobility Information", 3GPP TSG-RAN Working Group 2 meeting #84, R2-13xxxx, Agenda: 7.1.1.1, Nokia Corporation, Nov. 11-15, 2013, 4 Pages.

"3rd Generation Partnership Project;Technical Specification Group Radio Access Network;Evolved Universal Terrestrial Radio Access (E-UTRA);Radio Resource Control (RRC); Protocol specification(Release 12)", 3GPP TS 36.331, V12.3.0, Sep. 2014, pp. 1-378.

Extended European Search Report received for corresponding European Patent Application No. 14857764.6, dated Feb. 13, 2017, 9 pages.

"Granularity of Mobility Information", 3GPP TSG-RAN Working Group 2 meeting #83bis, R2-133384, Agenda: 7.1.1.1, Nokia Corpoartion, Oct. 7-11, 2013, 3 Pages.

"Corrections on the UE History Information", 3GPP TSG-RAN Working Group 3 meeting #77, R3-121788, ZTE, Aug. 13-17, 2012, 2 Pages.

"Providing Mobility Assistance Information Based on MSE and History Record", 3GPP TSG-RAN Working Group 2 meeting #79, R2-123614, Agenda: 7.2.2.2, ITRI, Aug. 13-17, 2012, 3 Pages.

"Signaling Details of Mobility Information", 3GPP TSG-RAN Working Group 2 meeting #84, R2-133911, Agenda: 1.1.1.1, Nokia Corporation, Nov. 11-15, 2013, 6 Pages.

* cited by examiner

SIGNALING FOR MOBILITY AND MOBILITY STATE ESTIMATION

RELATED APPLICATION

This application was originally filed as Patent Cooperation Treaty Application No. PCT/FI2014/050811 filed Oct. 30, 2014 which claims priority benefit to U.S. Provisional Patent Application No. 61/898,892, filed Nov. 1, 2013.

CROSS REFERENCE TO RELATED APPLICATION

This application claims the benefit under 35 U.S.C. §119 (e) of the following provisional application, which is incorporated herein by reference in its entirety: U.S. Ser. No. 61/898,892, entitled "SIGNALING FOR MOBILITY AND MOBILITY STATE ESTIMATION," filed Nov. 1, 2013.

FIELD

The subject matter described herein relates to wireless communications.

BACKGROUND

Although mobile networks seek to minimize signaling overhead and user equipment power consumption, overhead signaling and its associated power are especially an issue with small data transfers, such as machine-type communication devices and smartphones generating background traffic. Because the small data transfers represent a relatively small amount of data per burst, there is a high signaling overhead with respect to the amount of data transported in each burst. To minimize the signaling overhead in this type of irregular traffic, mobility information and traffic pattern information may be used to determine whether to release a connection or keep the user equipment in connected mode. Mobility information may also be used when trying to determine the offloading possibilities in a network including a heterogeneous network (for example, whether to handover the user equipment to a small cell for traffic offloading or whether it to keep the user equipment connected to a macro cell).

In Third Generation Partnership (3GPP) specifications, reporting of user equipment mobility information at the connection setup may be provided. Specifically, the user equipment may report an indicator of an availability of visited cell history, and report the mobility state estimation (MSE). This also allows the network to retrieve the visited cell history. The visited cell history may include cells visited while the user equipment was in an idle mode, time of stay, and physical cell identifiers of the visited cells, and the like.

SUMMARY

Methods and apparatus, including computer program products, are provided for signaling mobility and mobility state information.

In some example embodiments, there is provided a method. The method may include making mobility information including visited cell history available based on at least received mobility state estimation configuration information; and reporting, by the user equipment, the mobility information including the visited cell history. Related systems, apparatus, and articles of manufacture are also disclosed.

In some example embodiments, there may be provided another method including sending, by a network node, mobility state estimation configuration information; and receiving, by the network node, mobility information including visited cell history made available by a user equipment based on at least received mobility state estimation configuration information.

In some example embodiments, one of more variations may be made as well as described in the detailed description below and/or as described in the following features. The user equipment may receive the mobility state estimation configuration information. The mobility state estimation configuration may be received in a radio resource connection setup message. The user equipment may collect the visited cell history. The collected visited cell history is collected up to a maximum quantity of visited cells, and the oldest entry in the collected visited cell history may be replaced with a latest entry, when the maximum quantity of visited cells is reached. The visited cell history may be collected up to a threshold quantity of cells visited by the user equipment, wherein, when the threshold is at least one of met or exceeded, the user equipment replaces an older visited cell with a more recent visited cell. The collected visited cell history may include one or more cells visited by the user equipment. The mobility information may include mobility state estimation information. The mobility state estimation information may include at least one of a normal mobility, a medium mobility, or a high mobility. The reporting may be performed in response to the receiving. The reporting may be performed as part of a radio resource connection setup. The reporting may be performed, when requested by the network.

The aspects and features disclosed herein may be implemented in systems, apparatus, methods, and/or articles depending on the desired configuration. The details of one or more variations of the subject matter described herein are set forth in the accompanying drawings and the description below. Features and advantages of the subject matter described herein will be apparent from the description and drawings, and from the claims.

Figure 1:
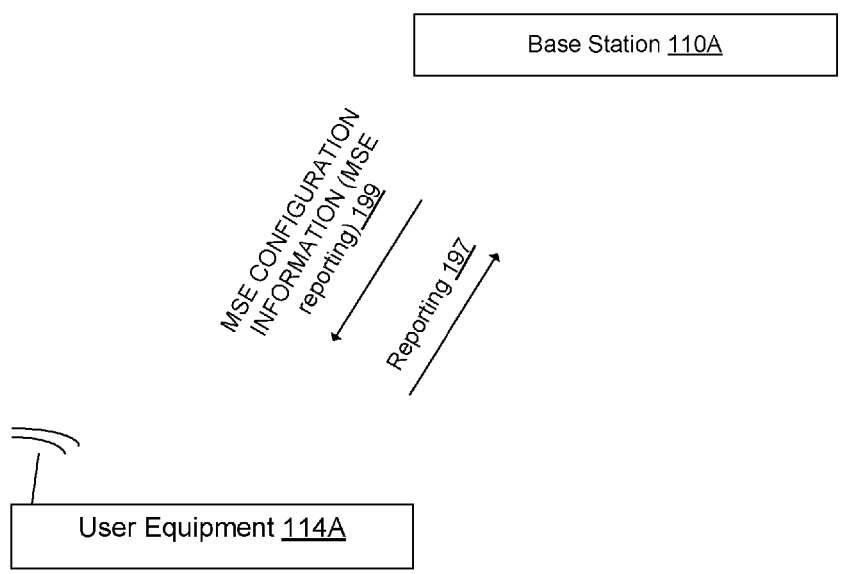
FIG. 1 depicts an example of a system for signaling mobility information and mobility state estimation, in accordance with some exemplary embodiments.

Like labels are used to refer to same or similar items in the drawings.

DETAILED DESCRIPTION

In some example embodiments, the subject matter disclosed herein may relate to the signaling of user equipment mobility information (for example, cells visited and the like) and MSE information (for example, a low mobility, a medium mobility, a high mobility, and the like). The signaling may, in some example embodiments, include implicit signaling of the availability of mobility information at the user equipment, which can thus be provided to the network upon a network request.

FIG. 1 depicts an example system 100 including at least one user equipment 114A and at least one base station 110A.

In some example embodiments, user equipment 114A may receive MSE configuration information from the network including base station 110A. This MSE configuration information may not only configure the user equipment 114A for MSE, but also indicate to user equipment 114A that it is to make available to the network mobility information, such as cell visited and the like. As such, the user equipment 114A does not need to explicitly signal the network/base station 110A regarding the availability of mobility information at the user equipment.

Figure 2:
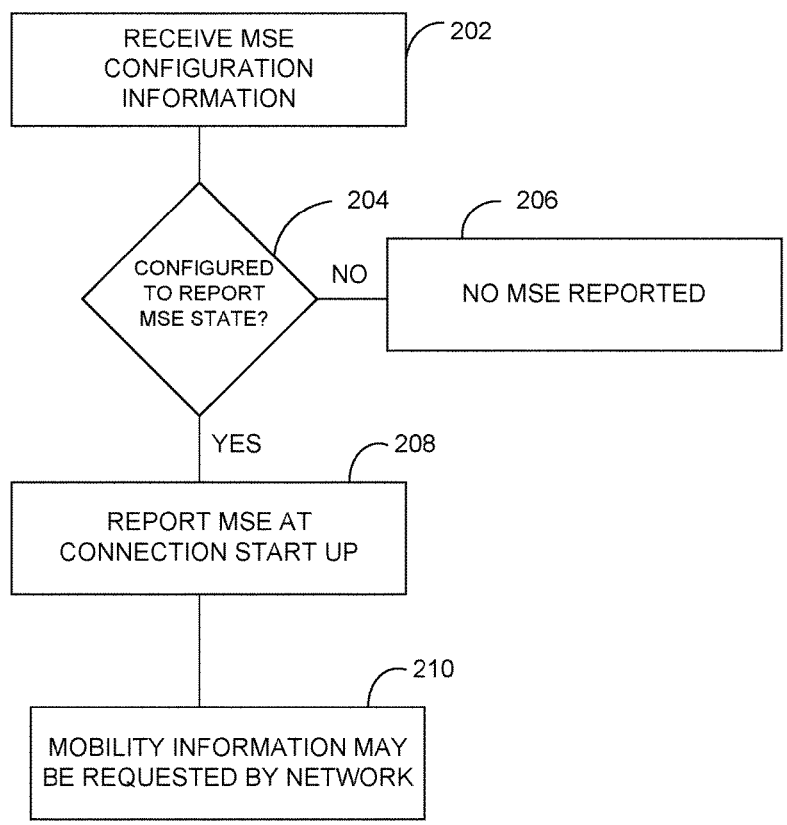
FIG. 2 depicts an example of a process for signaling mobility information and mobility state estimation, in accordance with some exemplary embodiments.

FIG. 2 depicts a process 200 for signaling, in accordance with some example embodiments. The description of FIG. 2 also refers to FIG. 1.

At 202, the user equipment 114A may receive MSE configuration information from the network including base station 110A. This MSE configuration information may be provided to the user equipment by the network via a broadcast control channel carrying a system information block (SIB), a connection setup message (for example, a radio resource connection setup message), and/or on any other message or channel. This MSE configuration may configure the user equipment for MSE and, for example, MSE reporting to the network/base station. In some example embodiments, the MSE configuration information, when received by the user equipment, may also indicate to the user equipment to make available mobility information, such as cell visited, duration in each cell, and the like, so that the mobility can be provided to the network. As such, the user equipment may not need to signal the network that mobility information is available at the user equipment.

If the received MSE configuration information does not indicate that the user equipment 114A should (or is required to) report MSE to the network including base station 110A, the user equipment 114A may not report MSE to the network (no at 204 and 206).

If the user equipment 114A is configured to report MSE, the user equipment 114A may report the MSE at for example a connection establishment/set up (yes at 204 and 208). Moreover, the user equipment 114A may make available mobility information, such as cells visited, cell identifiers, duration of visit, and the like. The user equipment 114A is implicitly indicating to the network the availability of mobility.

The MSE configuration information may include one or more parameters for MSE, such as the evaluation period and the thresholds as the number of cell changes to determine whether the user equipment is in a normal, a medium, or a high mobility state. There may or may not be a separate request for MSE reporting in the MSE configuration information. The mobility information may include a history of previous cells visited by the user equipment while in idle (or connected mode), duration of visit, cell identifier, and/or time of visit.

At 210, the user equipment 114 may receive from the network a request to report the available mobility information (if not already reported before the request). In E-UTRAN, the request may be done with the UEInformationRequest message and the report would be sent in the UEInformationResponse message.

Although process 200 describes implicit signaling, the user equipment 114A may be configured to always report MSE and/or mobility information.

In some example embodiments, user equipment 114A may be configured with a time-to-collect cell history information. For example, the network/base station may signal a validity time to the user equipment, although the validity timer may be specified in a standard as well. This validity time information may be sent in a broadcast message, such as a system information block and/or dedicated signaling (for example, RRC_ConnectionSetup, RRC_ConnectionReconfiguration message, and the like). The validity timer at the user equipment may indicate how long cell history information is to be kept by the user equipment. For example, the validity time may provide an observation window indicating how long the user equipment should monitor the cell changes.

In some example embodiments, the user equipment may be configured to have a maximum number of cells that it is allowed to keep in a visited cell history list. For example, the network/base station may signal to the user equipment with a maximum number of cells, although this maximum may be specified in a standard as well. This maximum number of cells information may be sent in a broadcast message, such as a system information block and/or dedicated signaling (for example, RRC_ConnectionSetup, RRC_ConnectionReconfiguration message, and the like). The user equipment may also be configured to retain visited cell history information up to a time defined by a required MSE parameter, such as the t-Evaluation parameter specified a SIB3 in 3GPP TS 36.331 section 6.3.1.

In some example embodiments, user equipment 114A may also collect cell history information from a certain maximum numbers of the cells, and then the user equipment 114A may then replace the oldest cell visited entry with most recent cell visited entry (for example, in accordance with first-in, first out when the list of visited cell history reaches a maximum). The network/base station may signal to the user equipment this maximum number, with a maximum number of cells, although this maximum may be specified in a standard as well. This maximum may be sent in a broadcast message, such as a system information block and/or dedicated signaling (for example, RRC_ConnectionSetup, RRC_ConnectionReconfiguration message, and the like). The maximum number of visited cells (or limit) may be formatted in accordance with a 3GPP abstract syntax notation format for a limit regarding reporting size and the like.

In some example embodiments, user equipment 114A may clear (for example, delete, postpone, or otherwise not store) mobility history and MSE information. For example, the UE 114A may clear mobility history and MSE information, when the UE 114A powers offs, changes radio access technologies (RATs), and/or changes networks (for example, public land mobile networks).

In some example embodiments, user equipment 114A may receive configuration information indicating the configuration of a report to the network. The configuration information may specify one or more of the following to the network/base station: MSE information; Idle information; Connected mode information; combination of idle and connected information; information from different radio access technologies, such as E-UTRAN (Evolved Uniform Mobile Telecommunications System Terrestrial Radio Access Network), UTRAN (Universal Terrestrial Radio Access Network), GERAN (GSM EDGE Radio Access; and the like.

Figure 3:
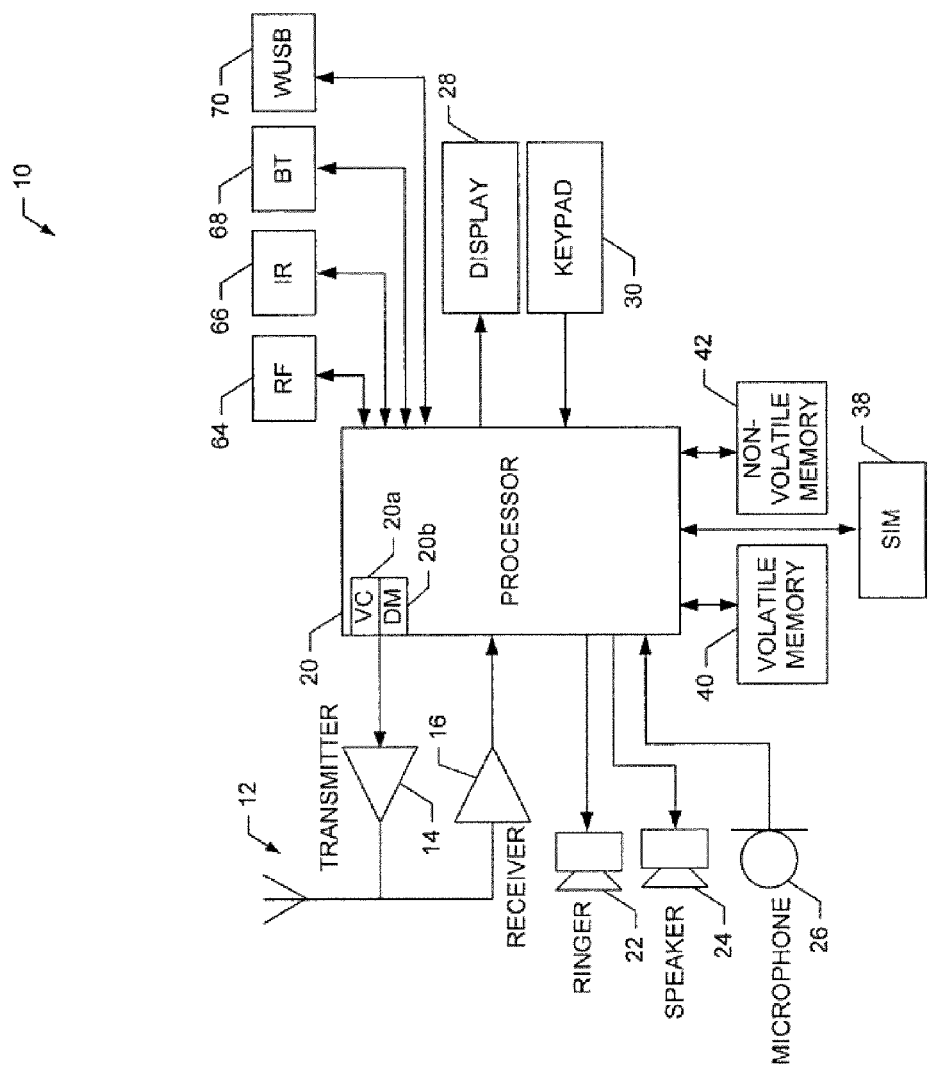
FIG. 3 depicts an example of a user equipment, in accordance with some exemplary embodiments.

FIG. 3 illustrates a block diagram of an apparatus 10, which can be configured as a user equipment 114A, in accordance with some example embodiments. Apparatus 10 may be implemented as a smart phone, mobile station, a mobile unit, a subscriber station, a wireless terminal, a tablet, a wireless plug-in accessory, or any other device with a short-range transceiver, such as Bluetooth, Bluetooth Low Energy, and the like. In some example embodiments, one or more portions of the apparatus 10 may be incorporated into a media player, such as a television, wireless speaker, and the like.

The apparatus 10 may include at least one antenna 12 in communication with a transmitter 14 and a receiver 16. Alternatively transmit and receive antennas may be separate.

The apparatus 10 may also include a processor 20 configured to provide signals to and receive signals from the transmitter and receiver, respectively, and to control the functioning of the apparatus. Processor 20 may be configured to control the functioning of the transmitter and receiver by effecting control signaling via electrical leads to the transmitter and receiver. Likewise, processor 20 may be configured to control other elements of apparatus 10 by effecting control signaling via electrical leads connecting processor 20 to the other elements, such as a display or a memory. The processor 20 may, for example, be embodied in a variety of ways including circuitry, at least one processing core, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits (for example, an application specific integrated circuit (ASIC), a field programmable gate array (FPGA), and/or the like), or some combination thereof. Accordingly, although illustrated in FIG. 3 as a single processor, in some example embodiments the processor 20 may comprise a plurality of processors or processing cores.

Signals sent and received by the processor 20 may include signaling information in accordance with an air interface standard of an applicable cellular system, and/or any number of different wireline or wireless networking techniques, comprising but not limited to Wi-Fi, wireless local access network (WLAN) techniques, such as Institute of Electrical and Electronics Engineers (IEEE) 802.11, 802.16, and/or the like. In addition, these signals may include speech data, user generated data, user requested data, and/or the like.

The apparatus 10 may be capable of operating with one or more air interface standards, communication protocols, modulation types, access types, and/or the like. For example, the apparatus 10 and/or a cellular modem therein may be capable of operating in accordance with various first generation (1G) communication protocols, second generation (2G or 2.5G) communication protocols, third-generation (3G) communication protocols, fourth-generation (4G) communication protocols, Internet Protocol Multimedia Subsystem (IMS) communication protocols (for example, session initiation protocol (SIP) and/or the like. For example, the apparatus 10 may be capable of operating in accordance with 2G wireless communication protocols IS-136, Time Division Multiple Access TDMA, Global System for Mobile communications, GSM, IS-95, Code Division Multiple Access, CDMA, and/or the like. In addition, for example, the apparatus 10 may be capable of operating in accordance with 2.5G wireless communication protocols General Packet Radio Service (GPRS), Enhanced Data GSM Environment (EDGE), and/or the like. Further, for example, the apparatus 10 may be capable of operating in accordance with 3G wireless communication protocols, such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The apparatus 10 may be additionally capable of operating in accordance with 3.9G wireless communication protocols, such as Long Term Evolution (LTE), Evolved Universal Terrestrial Radio Access Network (E-UTRAN), and/or the like. Additionally, for example, the apparatus 10 may be capable of operating in accordance with 4G wireless communication protocols, such as LTE Advanced and/or the like as well as similar wireless communication protocols that may be subsequently developed.

It is understood that the processor 20 may include circuitry for implementing audio/video and logic functions of apparatus 10. For example, the processor 20 may comprise a digital signal processor device, a microprocessor device, an analog-to-digital converter, a digital-to-analog converter, and/or the like. Control and signal processing functions of the apparatus 10 may be allocated between these devices according to their respective capabilities. The processor 20 may additionally comprise an internal voice coder (VC) 20a, an internal data modem (DM) 20b, and/or the like. Further, the processor 20 may include functionality to operate one or more software programs, which may be stored in memory. In general, processor 20 and stored software instructions may be configured to cause apparatus 10 to perform actions. For example, processor 20 may be capable of operating a connectivity program, such as a web browser. The connectivity program may allow the apparatus 10 to transmit and receive web content, such as location-based content, according to a protocol, such as wireless application protocol, WAP, hypertext transfer protocol, HTTP, and/or the like.

Apparatus 10 may also comprise a user interface including, for example, an earphone or speaker 24, a ringer 22, a microphone 26, a display 28, a user input interface, and/or the like, which may be operationally coupled to the processor 20. The display 28 may, as noted above, include a touch sensitive display, where a user may touch and/or gesture to make selections, enter values, and/or the like. The processor 20 may also include user interface circuitry configured to control at least some functions of one or more elements of the user interface, such as the speaker 24, the ringer 22, the microphone 26, the display 28, and/or the like. The processor 20 and/or user interface circuitry comprising the processor 20 may be configured to control one or more functions of one or more elements of the user interface through computer program instructions, for example, software and/or firmware, stored on a memory accessible to the processor 20, for example, volatile memory 40, non-volatile memory 42, and/or the like. The apparatus 10 may include a battery for powering various circuits related to the mobile terminal, for example, a circuit to provide mechanical vibration as a detectable output. The user input interface may comprise devices allowing the apparatus 20 to receive data, such as a keypad 30 (which can be a virtual keyboard presented on display 28 or an externally coupled keyboard) and/or other input devices.

As shown in FIG. 3, apparatus 10 may also include one or more mechanisms for sharing and/or obtaining data. For example, the apparatus 10 may include a short-range radio frequency (RF) transceiver and/or interrogator 64, so data may be shared with and/or obtained from electronic devices in accordance with RF techniques. The apparatus 10 may include other short-range transceivers, such as an infrared (IR) transceiver 66, a Bluetooth (BT) transceiver 68 operating using Bluetooth wireless technology, a wireless universal serial bus (USB) transceiver 70, a Bluetooth Low Energy link, ZigBee link, a cellular device-to-device link, a wireless local area link, a Wi-Fi link, and/or any other short-range radio technology. In this regard, the apparatus 10 and, in particular, the short-range transceiver may be capable of transmitting data to and/or receiving data from electronic devices within the proximity of the apparatus, such as within 10 meters, for example. The apparatus 10 including the WiFi or wireless local area networking modem may also be capable of transmitting and/or receiving data from electronic devices according to various wireless networking techniques, including 6LoWpan, Wi-Fi, Wi-Fi low power, WLAN techniques such as IEEE 802.11 techniques, IEEE 802.15 techniques, IEEE 802.16 techniques, and/or the like.

The apparatus 10 may comprise memory, such as a subscriber identity module (SIM) 38, a removable user identity module (R-UIM), a eUICC, an UICC, and/or the like, which may store information elements related to a mobile subscriber. In addition to the SIM, the apparatus 10 may include other removable and/or fixed memory. The apparatus 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices, for example, hard disks, floppy disk drives, magnetic tape, optical disc drives and/or media, non-volatile random access memory (NVRAM), and/or the like. Like volatile memory 40, non-volatile memory 42 may include a cache area for temporary storage of data. At least part of the volatile and/or non-volatile memory may be embedded in processor 20. The memories may store one or more software programs, instructions, pieces of information, data, and/or the like which may be used by the apparatus for performing functions of the user equipment/mobile terminal. The memories may comprise an identifier, such as an international mobile equipment identification (IMEI) code, capable of uniquely identifying apparatus 10. The functions may include one or more of the operations disclosed herein with respect to the user equipment and devices, such as the functions disclosed at process 200 and the like. The memories may comprise an identifier, such as an international mobile equipment identification (IMEI) code, capable of uniquely identifying apparatus 10. In the example embodiment, the processor 20 may be configured using computer code stored at memory 40 and/or 42 to receive mobility state estimation configuration information, make mobility information including visited cell history available based on at least the received mobility state estimation configuration information, and report the mobility information including the visited cell history, when request by the network, and/or the like as disclosed herein.

Figure 4:
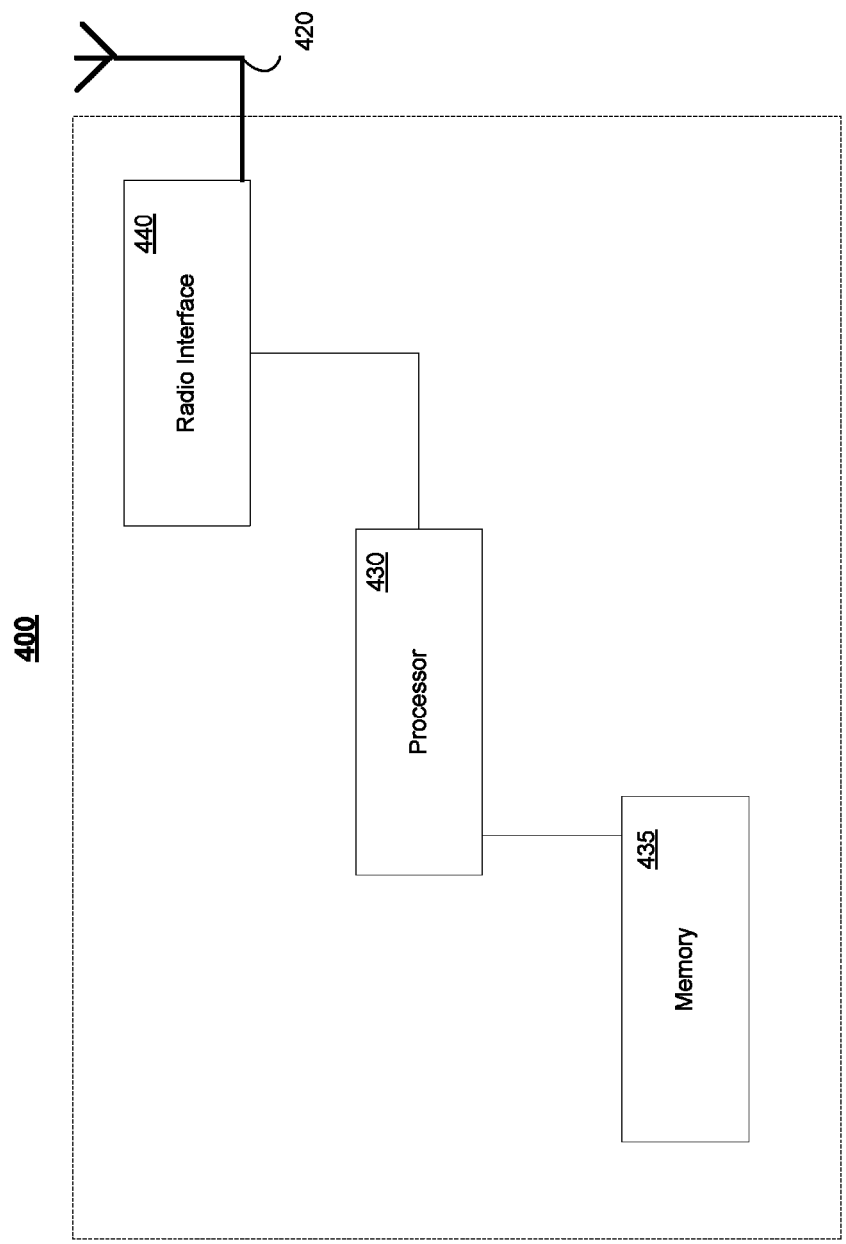
FIG. 4 depicts an example of a network node, in accordance with some exemplary embodiments.

FIG. 4 depicts an example implementation of a network node 400, such as for example a base station, an access point, and the like. The network node 400 may include one or more antennas 420 configured to transmit via a downlink and configured to receive uplinks via the antenna(s) 420. The network node 400 may further include a plurality of radio interfaces 440 coupled to the antenna 420. The radio interfaces may correspond one or more of the following: Long Term Evolution (LTE, or E-UTRAN), Third Generation (3G, UTRAN, or high speed packet access (HSPA)), Global System for Mobile communications (GSM), wireless local area network (WLAN) technology, such as for example 802.11 WiFi and/or the like, Bluetooth, Bluetooth low energy (BT-LE), near field communications (NFC), and any other radio technologies. The radio interface 440 may further include other components, such as for example filters, converters (for example, digital-to-analog converters and the like), mappers, a Fast Fourier Transform (FFT) module, and the like, to generate symbols for a transmission via one or more downlinks and to receive symbols (for example, via an uplink). The network node 400 may further include one or more processors, such as for example processor 430, for controlling the network node 400 and for accessing and executing program code stored in memory 435. In some example embodiments, memory 435 includes code, which when executed by at least one processor causes one or more of the operations described herein with respect to network node, such as for example a base station, access point, and the like. For example, network node 400 may send MSE configuration information to the user equipment, request mobility information, and/or other operations associated with the network node, base station, or access points disclosed herein.

Some of the embodiments disclosed herein may be implemented in software, hardware, application logic, or a combination of software, hardware, and application logic. The software, application logic, and/or hardware may reside on memory 40, the control apparatus 20, or electronic components, for example. In some example embodiment, the application logic, software or an instruction set is maintained on any one of various conventional computer-readable media. In the context of this document, a "computer-readable medium" may be any non-transitory media that can contain, store, communicate, propagate or transport the instructions for use by or in connection with an instruction execution system, apparatus, or device, such as a computer or data processor circuitry, with examples depicted at FIGS. 3 and 4 computer-readable medium may comprise a non-transitory computer-readable storage medium that may be any media that can contain or store the instructions for use by or in connection with an instruction execution system, apparatus, or device, such as a computer. In addition, some of the embodiments disclosed herein include computer programs configured to cause implicit signaling of mobility information/visited cell history reporting and other operations disclosed herein.

Without in any way limiting the scope, interpretation, or application of the claims appearing below, a technical effect of one or more of the example embodiments disclosed herein is reduced signaling overhead.

In some example embodiments, there may be provided a method. The method may include receiving, at the user equipment, mobility state estimation configuration information; making mobility information including visited cell history available based on at least the received mobility state estimation configuration information; and reporting, by the user equipment, the mobility information including the visited cell history, when request by the network.

If desired, the different functions discussed herein may be performed in a different order and/or concurrently with each other. Furthermore, if desired, one or more of the above-described functions may be optional or may be combined. Although various aspects of the invention are set out in the independent claims, other aspects of the invention comprise other combinations of features from the described embodiments and/or the dependent claims with the features of the independent claims, and not solely the combinations explicitly set out in the claims. It is also noted herein that while the above describes example embodiments, these descriptions should not be viewed in a limiting sense. Rather, there are several variations and modifications that may be made without departing from the scope of the present invention as defined in the appended claims. Other embodiments may be within the scope of the following claims. The term "based on" includes "based on at least."

What is claimed:

1. A method comprising:
   making, by a user equipment, mobility information available to a network, the mobility information including visited cell history made available in response to at least mobility state estimation configuration information received from the network in a radio resource connection setup message; and
   reporting, by the user equipment, the mobility information including the visited cell history to the network, the mobility information including the visited cell history being made available and reported without the apparatus signaling the network regarding the availability of the mobility information.

2. The method of claim 1 further comprising:
   collecting, by the user equipment, the visited cell history.

3. The method of claim 1, wherein the visited cell history is collected up to a maximum quantity of visited cells; and
   replacing an oldest entry in the collected visited cell history with a latest entry, when the maximum quantity of visited cells is reached.

4. The method of claim 2, wherein the collecting further comprises:
   collecting the visited cell history up to a threshold quantity of cells visited by the user equipment, wherein, when the threshold is at least one of met or exceeded, the user equipment replaces an older visited cell with a more recent visited cell.

5. The method of claim 1, wherein the mobility information includes mobility state estimation information.

6. The method of claim 5, wherein the mobility state estimation information includes at least one of a normal mobility, a medium mobility, or a high mobility.

7. An apparatus comprising:
   at least one processor; and
   at least one memory including computer program code, the at least one memory and the computer program code configured to, with the at least one processor, cause the apparatus to at least:
   make, by the apparatus, mobility information available to a network, the mobility information including visited cell history available in response to at least mobility state estimation configuration information received from the network in a radio resource connection setup message; and
   report, by the apparatus, the mobility information including the visited cell history to the network, the mobility information including the visited cell history being made available and reported without the apparatus signaling the network regarding the availability of the mobility information.

8. The apparatus as in claim 7, wherein the mobility state estimation configuration is received in a radio resource connection setup message.

9. The apparatus of claim 7, wherein the apparatus is further configured to at least collect, by the apparatus, the visited cell history.

10. The apparatus of claim 7, wherein the visited cell history is collected up to a maximum quantity of visited cells; and wherein the apparatus is further configured to replace an oldest entry in the collected visited cell history with a latest entry, when the maximum quantity of visited cells is reached.

11. The apparatus of claim 7, wherein the apparatus is further configured to collect the visited cell history up to a threshold quantity of cells visited by the apparatus, wherein, when the threshold is at least one of met or exceeded, the apparatus replaces an older visited cell with a more recent visited cell.

12. The apparatus of claim 7, wherein the mobility information includes mobility state estimation information.

13. The apparatus of claim 12, wherein the mobility state estimation information includes at least one of a normal mobility, a medium mobility, or a high mobility.

14. The apparatus of claim 7, wherein the reporting is performed as part of a radio resource connection setup.

15. An apparatus comprising:
    at least one processor; and
    at least one memory including computer program code, the at least one memory and the computer program code configured to, with the at least one processor, cause the apparatus to at least:
    send, by the apparatus, mobility state estimation configuration information to a user equipment; and
    receive, by the apparatus, mobility information including visited cell history made available by the user equipment in response to at least received mobility state estimation configuration information, wherein the mobility information including visited cell history is made available and reported to the apparatus without the user equipment signaling the apparatus regarding the availability of the mobility information.

16. The apparatus of claim 15, wherein the receiving occurs in response to a request from the apparatus, wherein the apparatus comprises a network node.

17. The apparatus of claim 15, wherein the receiving occurs with an explicit request by the apparatus.

18. The apparatus of claim 15, wherein the receiving is performed as part of a radio resource connection setup.

* * * * *